US006238634B1

(12) United States Patent
Gelblum et al.

(10) Patent No.: US 6,238,634 B1
(45) Date of Patent: May 29, 2001

(54) PROCESS FOR THE NONDESTRUCTIVE HEATING AND SUPPLY OF HOT AMMONIA OR HOT AMMONIA CONTAINING FEED GAS

(75) Inventors: Peter Gideon Gelblum, Philadelphia, PA (US); John J. Barnes, Wilmington, DE (US); Ioannis V. Bletsos, Vienna, WV (US); Norman Herron, Newark, DE (US); Tae Hoon Kim, Orange, TX (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/305,731

(22) Filed: May 5, 1999

Related U.S. Application Data
(60) Provisional application No. 60/084,239, filed on May 6, 1998.

(51) Int. Cl.[7] .................. C01B 21/00; C01C 3/02
(52) U.S. Cl. .......... 423/235; 423/375; 423/392; 423/403; 423/659
(58) Field of Search ................... 423/375, 376, 423/392, 403, 404, 407, 659, 235; 422/240, 241

(56) References Cited

U.S. PATENT DOCUMENTS

| 1,934,838 | 11/1933 | Andrussow | 23/151 |
|---|---|---|---|
| 2,906,604 | 9/1959 | Kaess et al. | 23/151 |
| 3,104,945 | 9/1963 | Jenks et al. | 23/151 |
| 3,401,108 | 9/1968 | Manlon et al. | 204/177 |
| 3,455,659 | 7/1969 | Longfield et al. | 23/293 |
| 3,660,024 | * 5/1972 | Gillespie | 423/403 |
| 5,262,145 | 11/1993 | Agrawal et al. | 423/372 |
| 5,431,894 | 7/1995 | Onishi et al. | 423/239.1 |

FOREIGN PATENT DOCUMENTS

| 0 113 524 A1 | 7/1984 | (EP) . | |
| 685744 | 7/1951 | (GB) | 1/1 |

OTHER PUBLICATIONS

Database Chemabs 'Online' Chemical Abstracts Service, Columbus, Ohio, U.S. Karavaev, M. M. et al.: "Precatalysis of ammonia oxidation in the manufacture of nitric acid" retrieved from STN Database accession No. 112:237617 CA, XP002147060.

* cited by examiner

Primary Examiner—Tom Dunn
Assistant Examiner—Maribel Medina

(57) ABSTRACT

A process for nondestructive heating and supplying of ammonia feed gas wherein high quality ammonia (typically greater than 90% and as high as 99%) is preserved at temperatures well in excess of the conventional limit of 230° C. (typically from 400 to 700° C.) by controlling the selection of metal surfaces in contact with the hot gas, the bulk temperature of the gas, the wall temperature, the pressure, the contact time, and the spatial surface density. Such hot gases are particularly useful for the manufacture of hydrogen cyanide.

3 Claims, No Drawings

PROCESS FOR THE NONDESTRUCTIVE HEATING AND SUPPLY OF HOT AMMONIA OR HOT AMMONIA CONTAINING FEED GAS

CROSS-REFERENCE TO RELATED APPLICATIONS

Applicants claim the benefit of priority to U.S. provisional application 60/084,239 filed May 6, 1998.

STATEMENT REGARDING FEDERALLY SPONSORED RESEARCH OR DEVELOPMENT

"Not Applicable".

1. Field of the Invention

This invention relates to a process for nondestructive heating and supply of ammonia or feed gases containing ammonia. The heated gases prepared according to the present invention may be used for the preparation of hydrogen cyanide or in other industrial synthesis.

2. Description of the Prior Art

Preheated ammonia is used in the production of hydrogen cyanide, hydrazine, and other nitrogen containing compounds.

Hydrogen cyanide is produced commercially by contacting ammonia, hydrocarbon gas, and an oxidizing gas with a platinum-group-metal catalyst (Andrussow Process) or by mixing low temperature ammonia gas feed with high temperature (more than 1,100° C.) methane in a chamber having ceramic walls coated with a platinum group metal catalyst (Degussa Process). In either of these processes, the various components of this feed gas may be preheated. Typically in the Andrussow Process, ammonia is preheated only to about 230° C. since it is subject to decomposition and is highly corrosive. Examples of the hydrogen cyanide process may be found in U.S. Pat. No. 1,934,838, U.S. Pat. No. 3,104,945 and British Patent No. 685,744.

Other uses of preheated ammonia are the production of nitric acid from an ammonia oxidation process, production of hydrazine, production of melamine, and ammonia reduction of nitrogen oxides (example, DENOX processes).

U.S. Pat. No. 3,455,659 describes a method of superheating ammonia to 550° C. to 750° C. using a reactor whose surface is either a nickel-chromium alloy or a nickel-chromium-molybdenum alloy. U.S. Pat. No. 2,906,604 discloses a method for producing hydrogen cyanide in which ammonia is preheated to 300–600° C. in aluminized reactor tubes. U.S. Pat. No. 5,431,894 also uses an aluminized reactor to preheat ammonia. In the patent, ammonia is heated up to 610° C. at atmospheric pressure. U.S. Pat. No. 3,401,108 preheats ammonia above 400° C., preferably 450–550° C.

Although it was known that ammonia containing gases could be heated to temperatures above 230° C., the prior art failed to teach the nondestructive heating of ammonia or ammonia containing feed gases or a way by which hot ammonia could be transferred nondestructively at an elevated temperature from a preheat zone into the reaction zone. Prior art also failed to teach a method of heating ammonia or ammonia containing feed gases in such a way that corrosion to the surfaces in direct contact with these hot gases was minimized.

Prior art preheating methods were also limited in that other gases such as methane or steam had to be excluded from the ammonia or mixed in only at very low concentrations. Thus, in the case of mixed reaction feed gases, each reactant, or in some cases mixtures of reactants excluding the ammonia, were subjected to separate preheating operations.

Preheated ammonia is highly corrosive, particularly to iron group metals and alloys, and causes high levels of metal corrosion and loss in equipment surfaces in contact with the hot gas. The corrosion not only leads to contamination of the preheated ammonia gas feed and ammonia decomposition (destruction) forming a more flammable hot gas, but also loss of operation time due to metal equipment repair or replacement.

BRIEF SUMMARY OF THE INVENTION

The present invention provides a method to preheat and supply that is transfer within a process, hot ammonia, as well as hot mixtures of ammonia with methane and/or steam.

The present invention provides a method to heat and supply these gases at temperatures up to 700° C. and at pressures of at least 1 atmosphere with minimum destruction of the ammonia and minimum corrosion of the metal surfaces in contact with the ammonia.

Feed gas streams containing ammonia preheated according to the present invention show less than 1.0% ammonia decomposition and corrosion rates of less than 20 mils (508 microns) per year at pressure. In general one can practice the present invention such that the ammonia decomposition is less than 10% and the corrosion rate is less than 50 mils per year (1,270 microns) and realize all the benefits of the invention. Such preheated feed gases are of benefit in production of hydrogen cyanide and other industrial products based on reaction of ammonia with other gaseous materials.

Thus, the present invention provides a process for the non-destructive heating and transferring of an ammonia containing gas having an oxygen content of less than 1.0% by volume comprising the steps of:

(a) heating the ammonia containing gas to a bulk gas temperature greater than 230° C. in equipment having a metal surface in contact with the hot ammonia and being characterized by a spatial surface density and a wall temperature; and (b) transferring the heated gas into a zone of chemical reaction through equipment having a metal surface in contact with the hot ammonia and being characterized by a spatial surface density and a wall temperature;

wherein the corrosion of metal surfaces in contact with the hot ammonia is less than 1,270 microns per year and the decomposition of the ammonia is less than 10% by volume of the total volume of ammonia present in the gas; with the proviso that (i) when the metal surface in contact with the hot ammonia is selected from the group palladium, platinum and gold, the spatial surface density of said equipment is less than 15 $cm^2/cm^3$, the contact time of the hot ammonia and the metal surface is less than 10 sec, the bulk gas temperature is not more than about 700° C. and the wall temperature is not more than about 800° C. and (ii) when the metal surface in contact with the hot ammonia is selected from the group consisting of austenitic steels and alloys of nickel (such as inconel and hastelloy), the spatial surface density of said equipment is less about 5 $cm^2/cm^3$, the contact time of the hot ammonia and the metal surface is less than 3 sec, the bulk gas temperature is not more than about 500° C. and the wall temperature is not more than about 600° C.

When the metal surface in contact with the hot gas is selected from the group consisting of austenitic steels and alloys of nickel such as inconel and hastelloy, the present process supplies hot ammonia containing gas at a bulk gas temperature of from 400 up to 500° C. When the metal surface in contact with the hot gas is selected from the group consisting of palladium, platinum and gold, the hot ammonia containing gas is supplied at a bulk gas temperature as high as 700° C.

As is illustrated by the Examples below, the present invention allows hot ammonia to be produced and supplied with less than 1% decomposition and with less than 508 mils of corrosion to the metal surface in contact with the hot ammonia or hot ammonia containing feed gas.

The equipment in the present process may be heated externally so that it functions as a preheater or it may simply be tubes or pipes to transfer the hot gas to the reaction zone. For either of these purposes, the equipment may be constituted of a first metal. This first metal may then be surface coated with a second metal at a preferred thickness of from 254 to 2,032 microns (10 to 80 mils). The second metal is selected from the group consisting of palladium, platinum and gold.

The ammonia containing gas may consist essentially of ammonia or be a mixture of ammonia and steam or ammonia and hydrocarbons. Other gases may also be present. In a mixture of ammonia, the hydrocarbon preferred is natural gas or methane, and it is preferred that the natural gas or methane be present at a volume ratio of from 0.7 to 1.3 compared to the volume of the ammonia.

The present process is useful in producing and delivering the hot ammonia containing gas into a chemical reaction zone to make hydrogen cyanide.

DETAILED DESCRIPTION OF THE INVENTION

As used herein the term bulk temperature or bulk gas temperature means the temperature of the hot gas measured at the center of the pipes or tubes used to heat or transfer the hot gas.

As used herein the term wall temperature is the temperature of the wall of the pipe or tube used to heat or transfer the hot gas. In practice the wall temperature would be the temperature of the interior wall of the pipe or tube (equipment) that is in actual contact with the hot gas, while in small laboratory testing equipment the wall temperature may be measured at the outside surface of the equipment.

High temperature reactions such as the synthesis of HCN from hydrocarbon gas, ammonia with or without an oxidizing gas, proceed more efficiently and more economically if the reactant gases are preheated before they contact the reaction catalyst.

The usual reaction temperature for the Andrussow type HCN process is 1,100° C. Best conventional practices only provide the non-destructive heating of ammonia up to about 230° C.

Presently in most Andrussow type HCN process, the ammonia is heated and then transferred by contacting an austenitic stainless steel alloy surface for a few seconds. Although air and natural gas can economically be preheated to about 600° C., the preheat of ammonia is "stuck" at about 230° C. This is because of the thermodynamic tendency of ammonia to begin to decompose above a temperature of about 188° C. Thus, once the preheated gases are combined, the temperature of the mixed feed gases (air and natural gas at 600° C. and ammonia at 230° C.) to the Andrussow-type HCN reaction/reactor is presently limited to about 500° C. This 500° C. is for gas delivery at atmospheric pressure. If the delivery pressure exceeds one atmosphere than the temperature must be less than 500° C. to limit ammonia decomposition and lessen corrosion of the metal surfaces of the equipment.

The production rate and yield of HCN, can, however, be increased when the temperature of the feed to the reactor is increased. For an Andrussow type HCN reaction the production of HCN may be increased by 25% when the temperature of the combined gas feed is increased from 230° C. to 520° C., by 33% for a 610° C. combined gas feed temperature, and by nearly 100% when the combined gas feed is at a temperature 850° C. Thus, increases in feed gas temperature result in a greater conversion of ammonia to HCN. For example, for the first case, 230° C., the conversion of ammonia increases from 58% to 68%. Higher feed gas temperatures correspondingly result in higher ammonia conversions. Higher conversions of ammonia improve the yield of HCN, and reduce the cost involved in recycle, thus reducing the overall production cost of HCN.

The preheat of any compound, i.e., including air, above 400° C. becomes exponentially more complex and in most cases becomes economically impractical above 900° C. In the case of mixtures of chemical compounds the preheat process and/or transfer and supply of hot gases becomes even more complex due to potential kinetic effects and chemical reactions forming of new compounds. Therefore, it is essential to preheat each of the compounds, e.g., ammonia, natural gas, and air/oxidant, only to the highest economically practical temperature which avoids chemical decomposition or reactions which may change the character of the feed gases, or to define submixtures or binaries mixtures that have the lowest tendency for decomposition or reaction forming undesired new products during the preheat (heating) or transfer steps. From these considerations, hot feed gases may be heated and supplied or transferred at some maximum temperatures that enhance reaction rate or conversion of reactant to product without undue formation of by-products, decomposition of feed gases or corrosive destruction of material surfaces in contact with the hot gases.

Although the above discussion describes considerations for the manufacture of HCN by the Andrussow process, it should be appreciated that hot ammonia or mixtures of ammonia with hydrocarbon or steam would be beneficial to other product synthesis reactions that employ ammonia gas as a feed and where preheated ammonia would provide an increased reaction rate, conversion or product yield.

The present process provides a method for the non-destructive heating and transferring of hot ammonia and hot mixtures of ammonia with other feed gases such as methane to temperatures up to 700° C. The ammonia containing gases that may be preheated according to the present invention may be mixtures of ammonia with gases such a carbon monoxide, methane or alkanes containing typically up to three carbon atoms. The ammonia gas may also be 100% ammonia or ammonia containing steam and/or trace amounts air or oxygen. Trace amounts includes up to but not more than 2% by volume of the total gas composition except that the total content of oxygen must not exceed 1% by volume. In the case of water, steam under the preheat and reaction conditions, the preheated gas of the present invention may contain up to 5% by volume steam and preferably 2% by volume steam mixed with the ammonia or the ammonia and hydrocarbon mixture.

The term non-destructive means that the gas is heated and maintained at a temperature higher than 400° C. with at least 90.0% ammonia stability (not more than about 10% decomposition by volume of the ammonia based on the total volume of ammonia initially present in the gas for a surface to volume ratio of up to 15 cm²/cm³; i.e., a "spatial surface density" as the phrase is used herein).

The process of the present invention also controls corrosion of the metal surfaces in contact with the hot ammonia. Metal surfaces in contact with the hot ammonia (less than 10% ammonia decomposition) of the present process show less than 50 mils per year corrosion loss. The process may also be run under conditions which limit the ammonia decomposition to 1% or less and an annual corrosion loss of less than 20 mils. By controlling the preheat and transfer of the hot ammonia the ammonia decomposition and annual corrosion can be to any limits less than 10% and 50 mils. This control of corrosion at the metal/hot gas interface is true for surfaces of equipment used to preheat and to transfer the hot ammonia or ammonia mixtures.

The present invention is a process which includes the production of an ammonia containing gas having a temperature of at least 400° C. The hot ammonia shows less than 10 mole percent ammonia degradation products. The process for the non-destructive heating and transferring of an ammonia containing gas having an oxygen content of less than 1.0% by volume comprising the steps of:

(a) heating the ammonia containing gas to a bulk gas temperature greater than 230° C. in equipment having a metal surface in contact with the hot ammonia and being characterized by a spatial surface density and a wall temperature; and (b) transferring the heated gas into a zone of chemical reaction through equipment having a metal surface in contact with the hot ammonia and being characterized by a spatial surface density and a wall temperature;

wherein the corrosion of metal surfaces in contact with the hot ammonia is less than 508 microns per year and the decomposition of the ammonia is less than 10% by volume of the total volume of ammonia present in the gas; with the proviso that (i) when the metal surface in contact with the hot ammonia is selected from the group palladium, platinum and gold, the spatial surface density of said equipment is less than 15 cm²/cm³, the contact time of the hot ammonia and the metal surface is less than 10 sec, the bulk gas temperature is not more than about 700° C. and the wall temperature is not more than about 800° C. and (i) when the metal surface in contact with the hot ammonia is selected from the group consisting of austenitic steels and alloys of nickel such as inconel and hastelloy, the spatial surface density of said equipment is less about 5 cm²/cm³, the contact time of the hot ammonia and the metal surface is less than 3 sec, the bulk gas temperature is not more than about 500° C. and the wall temperature is not more than about 600° C.

Typically a preheated ammonia/stream mixture and a preheated hydrocarbon gas/stream are jointly or separately fed to a reactor containing a platinum-group-metal catalyst. Air is typically used as the oxidizing gas but oxygen-enriched air or substantially pure oxygen may be used. The hydrocarbon normally contains one to three carbon atoms. Preferably the hydrocarbon is natural gas or methane. The hydrocarbon gas is typically preheated to between 400° C. and 800° C. According to the present invention mixtures of ammonia and natural gas or methane may be preheated to temperatures in excess of 230 and even in excess of 400° C. When such mixtures are used for the production of HCN by an Andrussow type process, the preferred volume ratio of methane or natural gas is from 0.7 to 1.3 compared to the volume of the ammonia.

The inventors of the present invention discovered that ammonia containing gases may be preheated and supplied into a reaction zone at the high temperatures while at the same time the ammonia degradation and metal corrosion could be limited and controlled by controlling, within limits, the parameters of the reactions taking place at the hot gas/metal interface.

According to the present invention the following parameters must be precisely controlled relative one to another to achieve the maximum bulk gas temperature at which ammonia may be heated non-destructively: 1) wall temperature of the heat transfer surface or surface of the metal in direct contact with the hot ammonia or ammonia containing feed gas; 2) material of construction (metal or combination of metals) of the heat transfer surface or surface in direct contact with the hot ammonia or ammonia containing feed gas; 3) the bulk temperature of the ammonia containing gas; 4) the contact time or residence time of the ammonia or ammonia containing feed gas with the material of construction; 5) the configuration of the material of construction represented by its spatial surface density; and 6) the pressure of the gas. Spatial surface density is the ratio of interior surface area of the equipment to its volume. The practical upper limit of spatial surface volume of any straight tube is about 32 cm²/cm³. The term equipment means generally pipes and tubes although it includes the means necessary to generate, contain and convey reaction gases in a process.

By careful study these parameters as they relate one to another, the maximum temperature at which hot ammonia or hot ammonia containing feed gases may be heated and supplied non-destructively may be determined for any combination of these parameters. That is for each material of construction and wall temperature, there are precise combinations of spatial density and contact time that result in a hot stable ammonia feed gas having less than 10% ammonia decomposition and causing less than 20 mils per year corrosion to the metals in contact with the hot gas.

Materials of construction, that is the metals that is in contact with the hot ammonia, may be classified in the practice of the present invention as noble metals and transition metal compositions. Noble metals include palladium, platinum and gold and other such metals known for their relatively low chemical activity. Transition metals as used herein mean metals and combinations of metals of Period 4, Groups IVb to VIII of the Periodic Chart. These include combinations of metals such as austenitic steels and alloys of nickel such as inconel and hastelloy.

For noble metals and a spatial surface density of up to 15 cm²/cm³, ammonia may be nondestructively heated and supplied at temperatures up to about 700° C. (equipment wall temperatures of up to about 800° C.) and contact times of up to 10 seconds.

For materials of construction of transition metal composition having a spatial surface density of from about 5 cm²/cm³, ammonia may be nondestructively heated and supplied at temperatures from about 250 to 500° C. (equipment wall temperatures of up to about 600° C.) and contact times up to 3 seconds. The transition metals include individual metals of the inconel group although typically these metals are used in industrial applications as alloys of nickel such as inconel and hastelloy.

The actual temperature of delivery of the ammonia is directly related to the wall temperature, heat transfer characteristics of the material of construction, the spatial surface density of the configuration of the preheat reactor and residence time of the gas in the preheat reactor. When the material of construction is a noble metal, wall temperatures of as much as 800° C. may be used to result in an ammonia feed gas temperature of as much as 700° C. Combinations of contact time and spatial surface density may be varied to provide a temperature within a range for which hot ammonia gas stability is from about 90.0% to 100%. For a specific material of construction in contact with a specific mixture of ammonia containing hot gases, the contact time is increased, the spatial surface density needs to be decreased to continue to provide hot ammonia at a fixed stability and at a fixed temperature. Conversely, for a specific material of construction in contact with a specific mixture of ammonia containing hot gases, as the contact time is increased the spatial surface density needs to be decreased in order to continue to supply hot ammonia at a fixed stability and at a fixed temperature.

When the material of construction is a transition metal composition, wall temperatures of as much as 600° may be used to result in an ammonia feed gas temperature of as much as 500° C. Combinations of contact time and spatial surface density may be varied to provide a range of gas temperatures with in a range of hot ammonia gas stability of from about 90.0% to 100%. For a specific material of construction in contact with a specific mixture of ammonia containing hot gases, as the contact time is increased, the spatial surface density needs to be decreased to continue to provide hot ammonia at a fixed stability and at a fixed temperature. Conversely, for a specific material of construction in contact with a specific mixture of ammonia containing hot gases, as the contact time is increased the spatial surface density needs to be decreased in order to continue to supply hot ammonia at a fixed stability and at a fixed temperature.

As illustrated by the examples below the present invention provides a process by which ammonia or ammonia containing gases can be heated and supplied at temperatures up to 700° C. with less than 1% ammonia decomposition and with less than 508 microns of corrosion to the hot metal surface in contact with the ammonia.

The walls of the heat transfer reactor (equipment used to heat the gas) may be heated by any means, for example, fired heating, hot gases, and resistive heating.

Ammonia preheat reactors may be constructed from steel or other conventional materials of construction. The surface of the reactor which is contact with the ammonia may be surface coated with palladium, platinum, or gold. The surface coating may be applied by any means by which a thin layer of one metal is applied to the surface of another metal, for example, bonding, coating, brushing, and lining. Lining is the most preferred method. Once surface coated, it is the surface coating that constitutes the material of construction (MOC), that is the metal surface that is in thermal contact with the ammonia and forms the metal/gas interface. The preferred thickness for the metal surface coating is from 254 to 2,032 microns (10 to 80 mils) although it may be thicker if desired.

Ammonia heating, storing and delivery system configurations include but are not limited to tubular, pipe, and shell. In any event, the heating and delivery system should be configured of low spatial surface density, that is the ratio of the surface area to the volume should be less than 15 $cm^2/cm^3$.

The ammonia feed gas that may be preheated according to the process may contain 33 mole percent or more ammonia. The feed gas may also contain hydrocarbon gases such as natural gas or methane. The feed gas may also contain inert gasses that is gasses that do not react with ammonia or cause metal corrosion at the preheat conditions, for example carbon monoxide and steam up to 5% by volume.

The following examples 1 to 6 were run in a 22 mm diameter silica glass tube having a 90 mm long heated zone. The heated zone was lined with the metal surface to be tested (this is also called the material of construction or MOC). This tube was also served as the chute to a model 9000 Thermal Analyzer manufactured by TA Instruments of New Castle, Del. To study corrosion and coking, a coupon of the MOC was hung from the balance of Thermal Analyzer. The spatial surface density, that is the surface/volume ratio of the tube was about 2 $cm^2/cm^3$.

The temperature was measured in two locations. The wall temperature was measured as the outside temperature of the wall of the tube. Heat was provided to the tube by a resistance heater that surrounded the length of the hot zone. A bulk gas temperature was measured at the center of the tube at the position of the balance of the Thermal Analyzer.

The contact time was calculated based on the average temperature of a central 50 mm length of the 90 mm tube.

For the studies of the Pd lined tube, the reaction tube of Examples 1 to 6 was limited to a maximum wall temperature of about 820° C. due to the formation of a eutectic from the glass and the palladium metal. Although even at wall temperature of 820° C., just before the onset of the eutectic, the composition of the hot ammonia containing gas (at temperature at or above 720° C.) was well within the limits of the present invention showing no indication of ammonia decomposition above that desired.

In the examples the ammonia was mixed with helium or methane at 50% by volume then fed at room temperature and atmospheric pressure into the heated zone. The hot gas exiting the hot zone was cooled indirectly by air and analyzed on-stream by FTIR within one second of the time the gas exited the hot zone.

For experiments showing the behavior of hot ammonia mixed with steam, the steam (water vapor content) was added to the mixed gas by saturating the helium with water by bubbling the helium gas through water at atmospheric pressure and about 29° C. The water saturated helium gas was then mixed with the ammonia gas before entry into the tube.

Data were collected by recording simultaneously the changes in the composition of the gas in contact with the hot wall, i.e., wall liner as well as changes of weight resulting from the reciprocal reaction of the gas mixture flowing over the coupon made of exactly the same material as the lining and having the same temperature as the bulk of the gas. Thus in addition to the gas composition measured by FTIR the test system also measures the weight gain or loss of the coupon.

Post-reaction optical microscopy and spectroscopic analyses by ESCA, TOF-SIMS, and SNMS of the coupon and the lining reveal the details of surface reactions with the hot gaseous feed mixtures.

EXAMPLE 1

This example demonstrates the conditions at which dry ammonia was at least 90.0% stable. Tests were run at atmospheric pressure as described above. The table 1 describes the highest wall temperatures at which the ammonia stability was at least 90.0%. In fact each entry in the table represents conditions at which the ammonia was 99% stable. Contact times of the ammonia in the tube at the maximum temperature range from about 0.2 to about 0.4 seconds. SS304 stands for stainless steel 304. Feed gas composition was 50% ammonia and 50% helium; s/v was less than or equal to 2 $cm^2/cm^3$.

TABLE 1

| MOC | Wall Temperature (° C.) | Bulk Temperature (° C.) | Contact Time (sec) |
|---|---|---|---|
| SS310 | 600 | 495 | 0.29 |
| SS304 | 500 | 416 | 0.33 |
| Ni | 600 | 507 | 0.29 |
| Inconel 600 | 600 | 530 | 0.28 |
| Pd | 800 | 667 | 0.24 |
| Pt | 800 | 641 | 0.26 |
| Au | 800 | 598 | 0.26 |

EXAMPLE 2

This example shows the stability of dry ammonia as a function of contact time. Tests were run as outlined above. SS302 stands for stainless steel 302. Feed gas composition was 50% ammonia and 50% helium; s/v was less than or equal to 2 cm$^2$/cm$^3$.

TABLE 2

| MOC | Wall Temperature (° C.) | Bulk/TGA Temperature (° C.) | Contact Time (sec) | Stability of Ammonia (%) |
|---|---|---|---|---|
| SS302 | 500 | 458 | 1.95 | 100 |
|  | 500 | 448 | 3.96 | 98 |
| Pd | 800 | 653 | 1.70 | 100 |
|  | 800 | 629 | 7.50 | 94 |

To secure a 99% stability of the ammonia gas when the gas is in contact with stainless steels at a maximum ammonia temperature of 500° C and at an s/v of 2 cm$^2$/cm$^3$, residence times must be less than about 2 seconds. Contact times will vary for various stainless steels particularly in relationship to the amount of chromium in the alloy. The greater the content of chromium in the stainless steel, the longer the contact time or the higher the s/v allowed at the maximum temperature, 500° C. bulk gas temperature and 600° C. wall temperature.

For palladium, the maximum temperature is increased and longer contact times and higher s/v's are possible.

EXAMPLE 3

This example shows the stability of dry ammonia as a function of surface to volume (S/V) ratio and MOC. The tests were run as described above except that the s/v was varied by adding metal in the shape of an accordion into the 25 mm center of the heated zone of the reactor and the s/v was varied as shown in Table 3. The contact time for the tests shown was 0.3 seconds based on the 25 mm length; the gas composition was 50% ammonia and 50% helium.

TABLE 3

| MOC | Wall Temperature (° C.) | Bulk/TGA Temperature (° C.) | S/V | Stability of Ammonia Volume (%) |
|---|---|---|---|---|
| Pd | 750 | 677 | 6.8 | 99.0 |
| Pd | 750 | 673 | 11.8 | 96.0 |
| ss304 | 650 | 572 | 3.0 | 98.0 |
| ss321 | 650 | 534 | 3.0 | 89.0 |
| ss310 | 650 | 540 | 1.8 | 98.0 |

Although all materials satisfy the requirements of the present invention, the table clearly shows the lower catalytic effect of the Pd surface on the stability of the hot ammonia in spite of the higher wall and bulk gas temperatures, as well as showing the effect of higher s/v on the same.

EXAMPLE 4

This example shows the effects of contact times for three materials of construction (MOC's), and the effects of bulk gas temperature for the three MOC's. Tests were run with the feed gas composition of 50% ammonia and 50% methane.

TABLE 4

| MOC | Wall/Lining Temperature (° C.) | Bulk/TGA Temperature (° C.) | Contact Time (sec) | Stability of Ammonia (%) |
|---|---|---|---|---|
| SS321 | 500 | 407 | 0.70 | 100 |
|  | 600 | 477 | 0.3 | 100 |
|  | 600 | 493 | 0.6 | 97 |
|  | 650 | 528 | 0.3 | 92 |
| SS310 | 600 | 512 | 0.29 | 100 |
|  | 700 | 604 | 0.26 | 95 |
| Pd | 700 | 590 | 0.26 | 100 |
|  | 700 | 605 | 0.65 | 100 |
|  | 600 | 460 | 0.31 | 100 |
|  | 800 | 681 | 0.24 | 100 |
|  | 800 | 629 | 7.5 | 94 |

For stainless steel 321, an increase of the bulk gas temperature of about 86° C. at a contact time of 0.65 sec, yields a loss in the stability of ammonia from 100 to 97%, similarly a doubling of the contact time at a bulk temperature of about 485° C. produced a drop of only 3% in the ammonia stability.

When stainless steel 310 is the MOC and the contact time is about 0.3 seconds, an increase of bulk temperature of approximately 92° C. results in only decrease of 5% in the stability of the hot ammonia.

The Pd tests show that over the same range of contact times of 0.3 to 0.65 sec and even at bulk gas temperatures of 680° C., the hot ammonia is stable. However, at a wall temperature of 800° C., there is a decrease in the ammonia stability. If one plots this data for contact times of approximately 0.3 seconds, the plot indicates that even at a bulk gas temperature of 800° C., the ammonia would have a stability of at least 90%.

EXAMPLE 5

This example illustrates the measurement of the corrosion of the MOC.

A coupon of the MOC was suspended from the TGA balance. In these tests the same MOC was also lined the tube so that the corrosion rate as well as the ammonia decomposition could be observed. After exposure to the hot ammonia, the coupon was removed from the balance and inspected visually and spectroscopically.

The 304 stainless steel was rough and discolored at a wall temperature of 500° C. and showed a 6,000 nm thick uniform nitride layer. The Pd coupon was matt gray, but showed a nitride layer of less than 3 nm thickness at 850° C.

Depth measurements were made using optical metallography. These measurements are summarized in Table 5. ESCA data indicated the type of nitride or other metal compounds detected.

Test data presented were collected non-continuously for three days for a total of 18 to 20 hours, i.e., in a closed system that was sealed off from air and exposed during the overnight down time only to nitrogen.

TABLE 5

| MOC | TGA Weight Change of wt. % | Depth Profiling Nitrides Atomic % N nm | Annual Corrosion mirons/year |
|---|---|---|---|
| a. SS304 T-wall = 50° C. | >+1. | 22 > 6000 (ESCA: CrnN,FenN) | <125 |
| b. Pd. T-wall = 50° C. | None | None <5. Partly (ESCA: as Pd nitrides and part as cyanide) | <0.1 |

EXAMPLE 6

The following example simulates supplying a mixture of hot ammonia and steam.

A mixture of 50% by volume ammonia and 50% by volume water saturated helium was tested as described above. The MOC was palladium.

The wall temperature, bulk gas temperature and ammonium stability are reported in the table below.

The helium gas was saturated with water at 29.2° C. and atmospheric pressure by first bubbling the helium through water. The resulting volume fraction of the water in the mixed gas was 0.02%.

In all data reported below the s/v was about 1.8 $cm^2/cm^3$. Dry samples of gas are noted as (d) and wet samples (w).

TABLE 6

| wall t, ° C. | bulk gas t, ° C. | NH3 stability Vol % NH3 | Contact sec |
|---|---|---|---|
| 600 | 545 | 100 | 2.2(d) |
| 600 | 559 | 100 | 2.2(w) |
| 700 | 623 | 100 | 2.0(d) |
| 700 | 626 | 99 | 2.0(w) |
| 800 | 706 | 100 | 1.8(d) |
| 800 | 712 | 97 | 1.8(w) |

Having thus described and exemplified the invention with a certain degree of particularity, it should be appreciated that the following claims are not to be so limited but are to be afforded a scope commensurate with the wording of each element of the claim and equivalents thereof.

We claim:

1. A process for the non-destructive heating and transferring of an ammonia containing gas having an oxygen content of less than 1.0% by volume comprising the steps of:
    (a) heating the ammonia containing gas to a bulk gas temperature greater than 230° C. in equipment having a metal surface in contact with the hot ammonia and being characterized by a spatial surface density and a wall temperature; and
    (b) transferring the heated gas into a zone of chemical reaction through equipment having a metal surface in contact with the hot ammonia and being characterized by a spatial surface density and a wall temperature;
wherein the corrosion of metal surfaces in contact with the hot ammonia is less than 1,270 microns per year and the decomposition of the ammonia is less than 10% by volume of the total volume of ammonia present in the gas; wherein (i) when the metal surface in contact with the hot ammonia is selected from the group consisting of palladium, platinum and gold, the spatial surface density of said equipment is less than 15 $cm^2/cm^3$, the contact time of the hot ammonia and the metal surface is less than 10 sec, the bulk gas temperature is not more than 700° C. and the wall temperature is not more than 800° C. and (ii) when the metal surface in contact with the hot ammonia is selected from the group consisting of austenitic steels and alloys of nickel, the spatial surface density of said equipment is less 5 $cm^2/cm^3$, the contact time of the hot ammonia and the metal surface is less than 3 sec, the bulk gas temperature is not more than 500° C. and the wall temperature is not more than 600° C.

2. A process of claim 1 wherein the corrosion of metal surfaces in contact with hot ammonia is less than 508 microns per year and the decomposition of the ammonia is less than 1% by volume of the total volume of ammonia present in the gas.

3. A process for the non-destructive heating and transferring of an ammonia containing gas having an oxygen content of less than 1.0% by volume comprising the steps of:
    (a) heating the ammonia containing gas to a bulk gas temperature greater than 230° C. in equipment having a metal surface in contact with the hot ammonia and being characterized by a spatial surface density and a wall temperature; and
    (b) transferring the heated gas into a zone of chemical reaction through equipment having a metal surface in contact with the hot ammonia and being characterized by a spatial surface density and a wall temperature; wherein the corrosion of metal surfaces in contact with the hot ammonia is less than 1,270 microns per year and the decomposition of the ammonia is less than 10% by volume of the total volume of ammonia present in the gas; and wherein the metal surface in contact with the hot ammonia is selected from the group consisting of palladium, platinum and gold, the spatial surface density of said equipment is less than 15 $cm^2/cm^3$, the contact time of the hot ammonia and the metal surface is less than 10 sec, the bulk gas temperature is not more than 700° C. and the wall temperature is not more than 800° C.

* * * * *